A. H. GOOD.
FEED HOPPER.
APPLICATION FILED MAR. 11, 1916.
1,212,937.
Patented Jan. 16, 1917.
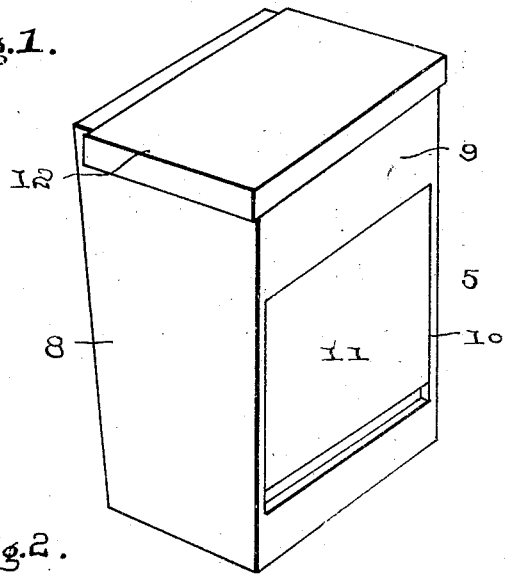
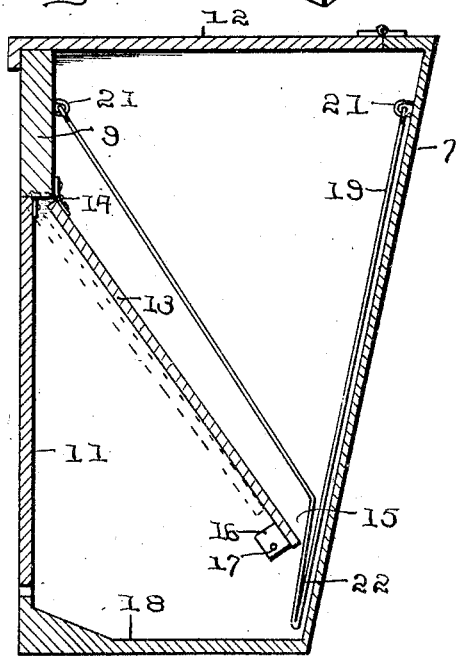 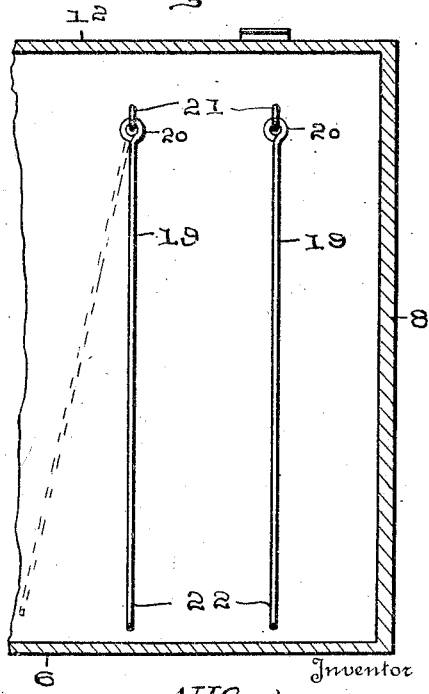

UNITED STATES PATENT OFFICE.

ALLEN H. GOOD, OF SPRING CITY, PENNSYLVANIA.

FEED-HOPPER.

1,212,937.  Specification of Letters Patent.  Patented Jan. 16, 1917.

Application filed March 11, 1916. Serial No. 83,581.

*To all whom it may concern:*

Be it known that I, ALLEN H. GOOD, a citizen of the United States, residing at Spring City, in the county of Chester and State of Pennsylvania, have invented certain new and useful Improvements in Feed-Hoppers; and I do hereby declare the following to be a full, clear, and exact description of the invention, such as will enable others skilled in the art to which it appertains to make and use the same.

This invention relates to feed hoppers of the type ordinarily used for feeding hogs, and the invention has for its primary object to provide an improved hopper embodying a novel type of animal operated agitating device for insuring a constant flow of feed to the bottom or trough of the hopper.

Another object is the provision of means for regulating the flow of feed to the trough.

With these and other objects in view, the invention consists in the novel construction, combination and arrangement of parts as will be hereinafter specifically described, claimed and illustrated in the accompanying drawing, in which:

Figure 1 represents a perspective view of the improved feed hopper, Fig. 2 represents a vertical sectional view therethrough, and Fig. 3 represents a fragmental sectional view, taken at right angles to Fig. 2.

Referring to the drawing in detail, wherein similar reference numerals designate corresponding parts throughout the several views, the numeral 5 indicates generally the feed containing hopper including a bottom 6, rear wall 7, side walls 8 and a front wall 9, having an opening 10 therein in which is hinged a door 11. The door 11 is hinged along its upper edge to the upper portion of the front wall 9 and the lower portion thereof is movable inwardly to the dotted line position illustrated in Fig. 2 to permit the hogs or other animals to feed. The top of the hopper is closed by a hinged cover 12 to facilitate filling thereof with feed.

A feed regulating plate 13 is hingedly secured at 14 along its upper edge to the front wall 9 and the swinging edge thereof terminates in spaced relation to the rear wall 7 to provide a discharge or feed opening 15, the width of which may be varied, as desired, to control the flow of feed to the lower portion of the hopper by a substantially square block 16, pivotally secured eccentrically, as at 17, to one of the side walls 8 of the hopper. The door 11 is movable rearwardly against the plate 13, as suggested in dotted lines in Fig. 2, to actuate the plate 13 and insure a constant flow of the contents of the hopper through the discharge opening 15. The front portion of the bottom of the hopper is inclined upwardly so as to provide a trough 18 for holding feed discharged through the opening 15.

A plurality of feed agitators 19 are provided with looped upper terminals 20, pivotally mounted in staples 21, or other suitable fasteners secured to the inner surfaces of the front and rear walls 9 and 7, respectively, whereby the lower ends of the agitators may swing longitudinally in the discharge opening 15 and insure a constant flow of feed therethrough. As clearly shown in Fig. 2, the upper free ends of the agitators 19 are extended divergently and connected with the staples, while the lower ends 22 thereof are V-shaped and project through the discharge opening 15 and terminate adjacent the bottom of the trough 18, so as to be engaged and swung laterally to the position illustrated in dotted lines in Fig. 3 by the animals during feeding.

What I claim is:

1. A feed hopper having an opening in the front wall thereof, a feed regulator plate pivotally mounted in said hopper, and a door hinged in said opening and adapted to engage and actuate said regulator plate.

2. A hopper having an opening in the front wall thereof, an inclined regulator plate pivotally mounted in said hopper, means for varying the position of said regulator plate with relation to the rear wall of the hopper, and a door hinged in said opening and adapted to engage and actuate said regulator plate.

3. A feed hopper having an opening in the front wall thereof, an inclined regulator plate pivotally mounted in said hopper, and a polygonal block eccentrically pivoted in said hopper and adjustably supporting the lower free end of said regulator plate.

4. A feed hopper including a body, an inclined regulator plate pivotally mounted in said body and terminating in spaced relation to the rear wall of the latter to provide a discharge opening, and a plurality of agitators pivotally secured to the front and rear walls of said hopper and having V- shaped lower terminals extending downwardly through said discharge opening and movable at right angles to said pivoted plate.

5. A feed hopper including a body, an inclined regulator plate arranged in said body and terminating in spaced relation to the rear wall of the latter to provide a discharge opening, a door pivotally secured in said body adapted to engage and actuate said regulator plate, and a plurality of agitators pivotally mounted in the upper portion of said hopper and extending downwardly through said discharge opening.

In testimony whereof I affix my signature in presence of two witnesses.

ALLEN H. GOOD.

Witnesses:
J. A. COULSTON,
VERA FLEMMING.